United States Patent
Sun (10) Patent No.: US 7,233,556 B2
(45) Date of Patent: Jun. 19, 2007

(54) DISK DISCRIMINATION METHOD

(75) Inventor: Yu-Hung Sun, Taipei (TW)

(73) Assignee: Lite-On It Corporation, Nelhu, Taipei (TW)

( * ) Notice: Subject to any disclaimer, the term of this patent is extended or adjusted under 35 U.S.C. 154(b) by 380 days.

(21) Appl. No.: 10/711,212

(22) Filed: Sep. 1, 2004

(65) Prior Publication Data

US 2005/0052977 A1   Mar. 10, 2005

(30) Foreign Application Priority Data

Sep. 4, 2003   (TW) .............................. 92124517 A (51) Int. Cl.
  *G11B 7/00*   (2006.01)
(52) U.S. Cl. .................................. 369/53.23
(58) Field of Classification Search ................ 369/53.2, 369/53.23, 44.27, 44.25, 44.26, 94
  See application file for complete search history.

(56) References Cited

U.S. PATENT DOCUMENTS

| | | | | |
|---|---|---|---|---|
| 6,327,234 B1 * | 12/2001 | Kamiyama et al. | ...... | 369/53.23 |
| 6,487,153 B2 * | 11/2002 | Kamiyama et al. | ...... | 369/53.23 |
| 6,747,931 B1 * | 6/2004 | Park | ...... | 369/53.23 |
| 6,879,555 B2 * | 4/2005 | Takeuchi | ...... | 369/53.23 |
| 6,956,801 B2 * | 10/2005 | Horimoto | ...... | 369/53.2 |

* cited by examiner

*Primary Examiner*—Thang V. Tran
(74) *Attorney, Agent, or Firm*—Winston Hsu (57) ABSTRACT

A method for discriminating an optical disk is disclosed. Peak values and trough values of focus error signal and RF level signal are detected by an operation of focus search. Threshold levels for detecting each material layer of the optical disk are determined according to the peak values and the trough values. Thereafter another focus search for the optical disk is executed to calculate a thickness of the substrate and a distance between the first and the second recording layer of the optical disk according to the threshold levels. Thus the type of the optical disk can be discriminated.

25 Claims, 5 Drawing Sheets

```
┌─────────────────────────────────────────────┐
│  Operate a first focus search for the       │  100
│             optical disk                     │
└─────────────────────────────────────────────┘
                      │
                      ▼
┌─────────────────────────────────────────────┐
│  Determine threshold levels of a focus      │
│  error signal and a RF level signal for     │  110
│  detecting each material layer of the       │
│             optical disk                     │
└─────────────────────────────────────────────┘
                      │
                      ▼
┌─────────────────────────────────────────────┐
│  Operate a second focus search for          │
│  detecting the distances between the        │  120
│  material layers so as to discriminate      │
│       the format of the optical disk        │
└─────────────────────────────────────────────┘
                      │
                      ▼
                    ( End )
```

DISK DISCRIMINATION METHOD

BACKGROUND OF INVENTION

1. Field of the Invention

The present invention relates to a disk discrimination method, and more specifically, to a stable disk discrimination method.

2. Description of the Prior Art

There are many kinds of optical disks, such as CD-ROM, CD-R, CD-RW, Hybrid CD, single-layer DVD, double-layer DVD, DVD-R, DVD+R, DVD-RW, DVD+RW, DVD-RAM, and so on. Because different kinds of optical disks have different data formats and different physical characters, an optical disk drive includes several data-reading methods, like exchanging wavelengths of the laser beams emitted from a pick-up head (CD: 780 nm, DVD: 650 nm) or amplifying some predetermined signals. Therefore, when the optical disk is loaded into the optical disk drive capable of reading various kinds of optical disks, the optical disk needs to be discriminated for determining the next data-reading step corresponding to the optical disk.

Figure 1:
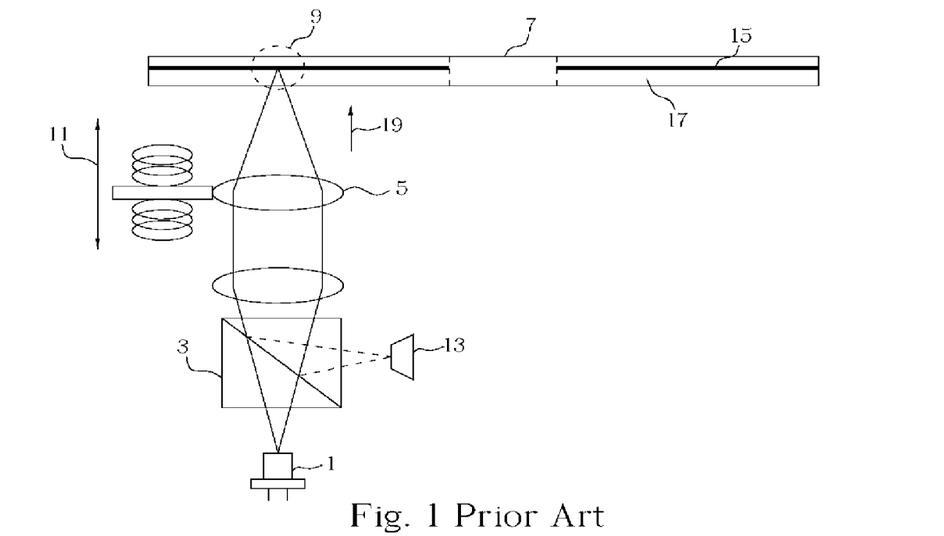
FIG. 1 is a diagram of a focus mechanism in an optical disk drive.

Please refer to FIG. 1. FIG. 1 is a diagram of a focus mechanism with a pick-up head of an optical disk drive. A laser diode 1 is used for generating a laser beam, and the laser beam generated by the laser diode 1 is passed through a beam splitter 3 and an object lens 5 to generate a focus point 9. A focus actuator 11 can actuate the object lens 5 to move upward or downward so as to change the location of the focus point 9. The light reflected from the focus point 9 on an optical disk 7 is emitted to a photo detector 13 via the beam splitter 3. The photo detector 13 can generate optical signals, such as focus error signal, RF signal, RF level signal, sub-beam add signal, and so on, for controlling focus of the laser beam.

There are two control methods for controlling the focus actuator 11. One is an open-loop control method, and the other is a close-loop control method. The disk discrimination is relative to the open-loop control method, and the detailed introduction is described as follows.

Figure 2:
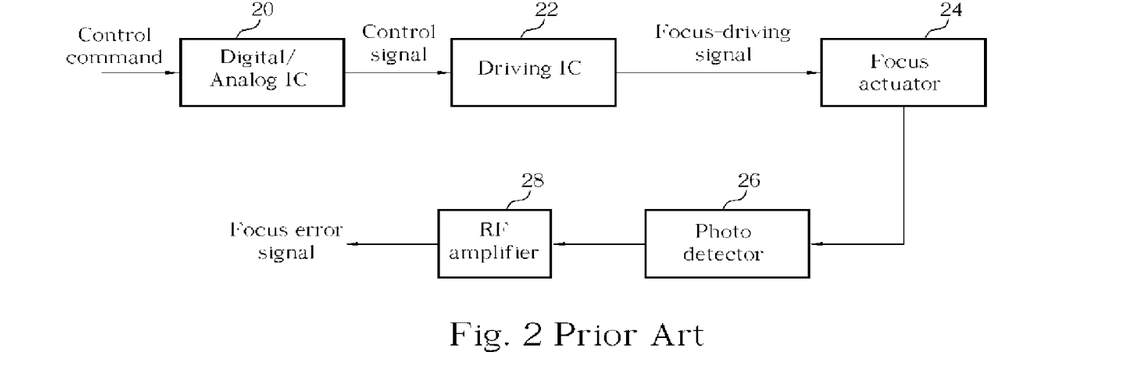
FIG. 2 is a control functional block diagram of the focus open-loop control method.

Please refer to FIG. 2. FIG. 2 is a control functional block diagram of the focus open-loop control method. A host sends a control command to a digital/analog IC 20, and then the digital/analog IC 20 generates a control signal. The control signal can be amplified by a driving IC 22 into a focus-driving signal to drive a focus actuator 24 so that the focus point can move upward (as a direction 19 shown in FIG. 1). At the same time, a photo detector 26 can generate a signal and transmit the signal to an RF amplifier 28 for generating a focus error signal. The distances between each material layers are determined according to the focus error signal.

An optical disk with a single recording layer structure is shown as the optical disk 7 in the FIG. 1. When the pick-up head reads/writes data from the optical disk, the laser beam will reach a reflective layer 15, the material layer for recording data, via a plastic layer 17. The thickness of the plastic layer 17 of a DVD-format optical disk is 0.6 mm while CD-format optical disk is 1.2 mm. Therefore the optical disk can be discriminated whether it is DVD format or CD format according to the distance from the surface of the plastic layer 17 to the reflective layer 15 (i.e. the thickness of the plastic layer 17).

Figure 3:
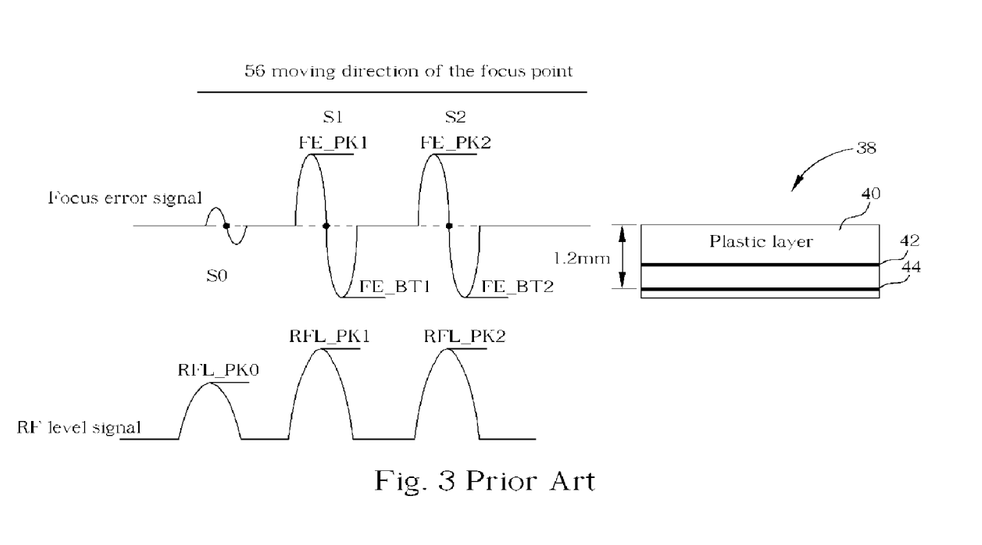
FIG. 3 is a diagram illustrating a S-curve of the focus error signal and the RF level signal in the prior art.

The conventional method for discriminating optical disks is by means of the focus error signal. Please refer to FIG. 3. FIG. 3 is a diagram illustrating a S-curve of the focus error signal and the RF level signal in the prior art. The focus point 9 is approaching a Hybrid CD 38 in a direction 56. The S-curve can be plotted by tracking the focus error signal. When the distance between the focus point 9 and the Hybrid CD 38 approaches infinity, the reflective light is slight so that the focus error signal is also slight. When the focus point 9 is approaching a first reflective layer 42 of the Hybrid CD 38, the focus error signal increases to a positive peak value FE_PK1. And when the focus point 9 reaches the first reflective layer 42, the focus error signal decreases to a zero intersection 52. Afterward the focus point 9 is away from the first reflective layer 42, the focus error signal decreases to a negative trough value FE_BT1 and then increases to the zero to form a S-curve.

As shown in FIG. 3, when the focus point 9 passes through three material layers, a plastic layer 40, the first reflective layer 42, and a second reflective layer 44, the focus error signal includes the S-curves S0, S1, and S2. The distances between the zero intersections 50, 52, 54 of the S-curves S0, S1, S2 are the distances between the material layers.

The optical disks are discriminated according to the distances between the zero intersections of the S-curves in the prior art. However the amplitude of the S-curve of the plastic layer is not so obvious as the ones of the first reflective layer 42 and the second reflective layer 44. Sometimes it is difficult to detect the distance between the plastic layer 40 and the first reflective layer 42, so it is also difficult to discriminate the format of the optical disk. Therefore there is a need to discriminate the format of the optical disk more efficiently.

SUMMARY OF INVENTION

It is therefore a primary objective of the present invention to provide a disk discrimination method to solve the problem mentioned above.

Briefly summarized, a method for discriminating an optical disk is disclosed. Amplitude of focus error signal and RF level signal are detected by an operation of focus search. Threshold levels for detecting each material layer of the optical disk are determined based on the amplitude of the focus error signal and RF level signal. Thereafter another focus search for the optical disk is executed to calculate a thickness of the substrate and a distance between the first and the second recording layer of the optical disk according to the threshold levels. Thus the type of the optical disk can be discriminated.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
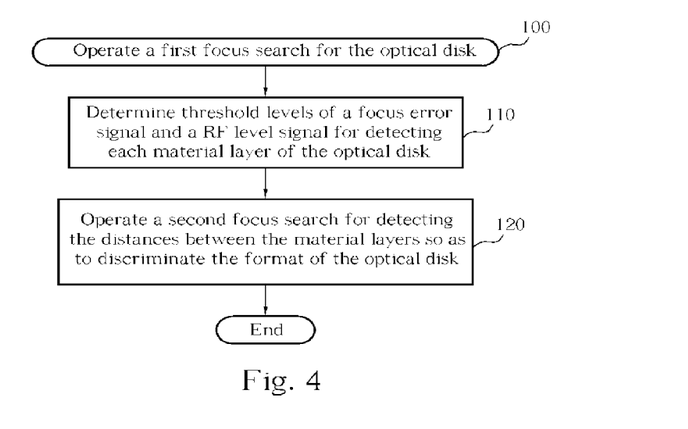
FIG. 4 is a flowchart of the disk discrimination according to the present invention.

The present invention utilizes a focus open-loop control method to detect the structure of an optical disk so as to discriminate the format of the optical disk. Please refer to FIG. 4. FIG. 4 is a flowchart of the disk discrimination according to the present invention. The method includes the following steps:

Step 100: Operate a first focus search for the optical disk.

Step 110: Determine threshold levels of a focus error signal and a RF level signal for detecting each material layer of the optical disk.

Step 120: Operate a second focus search for detecting the distances between the material layers of the optical disk so as to discriminate the format of the optical disk.

In step 100, an object lens can be moved upward and downward in the focus open-loop control method to operate the first focus search for the optical disk. For example, as shown in FIG. 3, when a focus point passes through a Hybrid CD which consists the plastic layer 40, the first reflective layer 42 (recording layer) and the second reflective layer 44 (recording layer), there are peaks (RFL_PK0, RFL_PK1, RFL_PK2) in the RF level signal while there are S-curves (S0, S1, S2) in the focus error signal. The peaks and troughs of the above mentioned signals can be detected by a peak detector. Thereafter the threshold levels in step 110 can be acquired based on the detected peaks and troughs.

Figure 5:
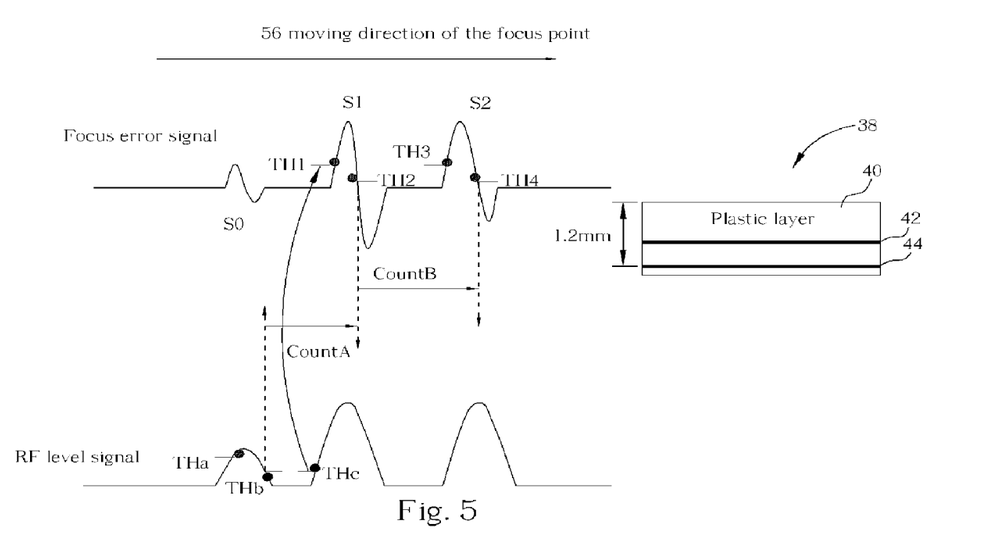
FIG. 5 is a diagram illustrating the threshold levels derived from the peaks and troughs of the signals in step 100 of the flowchart shown in FIG. 4.

In step 110, the threshold levels of the focus error signal and the RF level signal for detecting each material layer of the optical disk can be determined. This step is executed for calculating the distances between the material layers of the optical disk in step 120 more precisely Please refer to FIG. 5. FIG. 5 is a diagram illustrating the threshold levels (THa, THb, THc, TH1, TH2, TH3, TH4) derived from the peaks and troughs of the signals in step 100. The computation of the threshold levels is as follows:

THa and THb are the threshold levels of the RF level signal corresponding to the situation in which the focus point passes through the plastic layer 40.

$Tha=RFL\_PK0*Ra$ $(Ra<1);$ $THb=RFL\_PK0*Rb$ $(Rb<1);$ and $Ra \neq Rb$

THc is the threshold level of the RF level signal corresponding to the situation in which the focus point approaches the first reflective layer 42.

$THc=RFL\_PK1*Rc$ $(Rc<1);$

TH1 and TH2 are the threshold levels of the focus error signal in a half wave of the S-curve corresponding to the situation in which the focus point approaches the first reflective layer 42. Generally a positive peak of the S-curve is not necessarily symmetric to a negative through of the S-curve. That is, the absolute value of FE_PK1 is not necessarily equal to the absolute value of FE_BT1. For the accuracy of the measure, the greater half wave of the S-curve would be selected for determining the threshold level of the focus error signal.

$IF\ |FE\_PK1|>|FE\_BT1|$ $TH1=FE\_PK1*R1$ $(R1<1);$ $TH2=FE\_PK1*R2$ $(R2<1);$ and $R1 \neq R2$ $IF\ |FE\_PK1|<|FE\_BT1|$ $TH1=FE\_BT1*R1$ $(R1<1);$ $TH2=FE\_BT1*R2$ $(R2<1);$ and $R1 \neq R2$ IF |FE_PK1|=|FE_BT1|, TH1 and TH2 can be derived from either of the above methods.

TH3 and TH4 are the threshold levels of the focus error signal in a half wave of the S-curve corresponding to the situation in which the focus point approaches the second reflective layer 44. The method for generating TH3 and TH4 is similar to the method for generating TH1 and TH2. That is, the greater half wave of the S-curve would be selected for determining the threshold level of the focus error signal.

The threshold level mentioned above is derived from the product of the peak of the signal or the trough of the signal and a ratio, and the ratio is less than 1 and is derived from a previous experiment.

Figure 6:
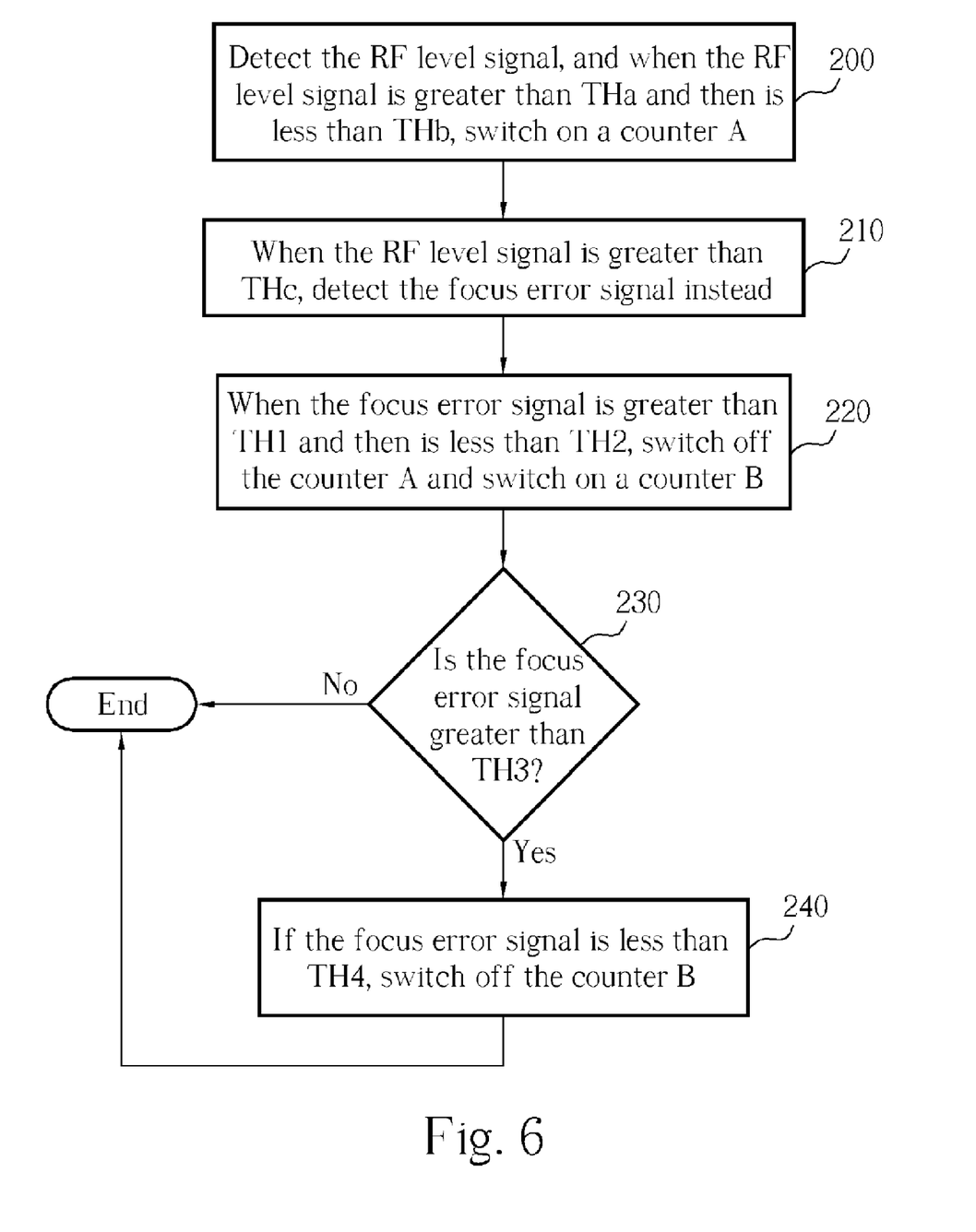
FIG. 6 is a detailed flowchart of the step 120 of the flowchart shown in FIG. 4.

After determining the threshold levels of the RF level signal and the focus error signal for detecting material layers of the optical disk in step 110, the second focus search in step 120 is executed. Please refer to FIG. 6. FIG. 6 is a detailed flowchart of the step 120. FIG. 6 illustrates the flowchart for detecting the format of the optical disk when the positive peak of the S-curve is greater than the negative trough of the S-curve.

Step 200: Detect the RF level signal, and when the RF level signal is greater than THa and then is less than THb, switch on a counter A.

Step 210: When the RF level signal is greater than THc, detect the focus error signal instead.

Step 220: When the focus error signal is greater than TH1 and then is less than TH2, switch off the counter A and switch on a counter B.

Step 230: If the focus error signal is greater than TH3, go to step 240; if not, end the process.

Step 240: If the focus error signal is less than TH4, switch off the counter B.

Please refer to FIG. 5. When the second focus search is executed, the RF level signal is detected first. When the focus point is approaching the surface of the plastic layer 40, the RF level signal is becoming greater. When the RF level signal is greater than the threshold level of the RF level signal THa, it means the plastic layer 40 exists, and the system continues detecting the RF level signal. When the RF level signal is less than the threshold level of the RF level signal THb, the focus point is passing through the surface of the plastic layer 40 and the system switches on the counter A, as shown in step 200. And then the system continues detecting the RF level signal. When the RF level signal is greater than the threshold level of the RF level signal THc, the focus point approaches the first reflective layer 42 and the system detect the focus error signal instead, as shown in step 210.

If the focus point approaches the first reflective layer 42 even more, the focus error signal becomes greater. When the focus error signal meets the threshold level of the focus error signal TH1, the focus point is near the first reflective layer 42. When the focus error signal meets the threshold level of the focus error signal TH2, the focus point reaches the first reflective layer 42. At the same time, the counter A stops counting, and a count value generated by the counter A, countA, corresponds to the distance between the plastic layer 40 and the first reflective layer 42, as shown in step 220.

When the counter A stops counting, the system switches on the counter B and then continues detecting the focus error signal. If the optical disk is a double-recording-layer optical disk, the S-curve of the second reflective layer 44 exists. And if the optical disk is a single-recording-layer optical disk, the S-curve of the second reflective layer 44 does not exist. So if the focus error signal is less than the threshold level of the focus error signal TH3 during a predetermined period, the optical disk is the single-recording-layer optical disk. And then the counter B stops counting to end the process, and the count value generated by the counter B is useless (step 230).

On the contrary, when the focus point approaches the second reflective layer 44, the focus error signal becomes greater. When the focus error signal meets the threshold level of the focus error signal TH3, the focus point is near the second reflective layer 44. When the focus error signal meets the threshold level of the focus error signal TH4, the focus point is reaching the second reflective layer 44. At the same time, the counter B stops counting, and a count value generated by the counter B, countB, corresponds to the distance between the first reflective layer 42 and the second reflective layer 44, as shown in step 240.

The format of the optical disk can be discriminated by step 120 (steps 200–240). According to the distances calculated by the counter A and the counter B, the distances between the material layers of the optical disk can be derived so as to discriminate the format of the optical disk.

Figure 7:
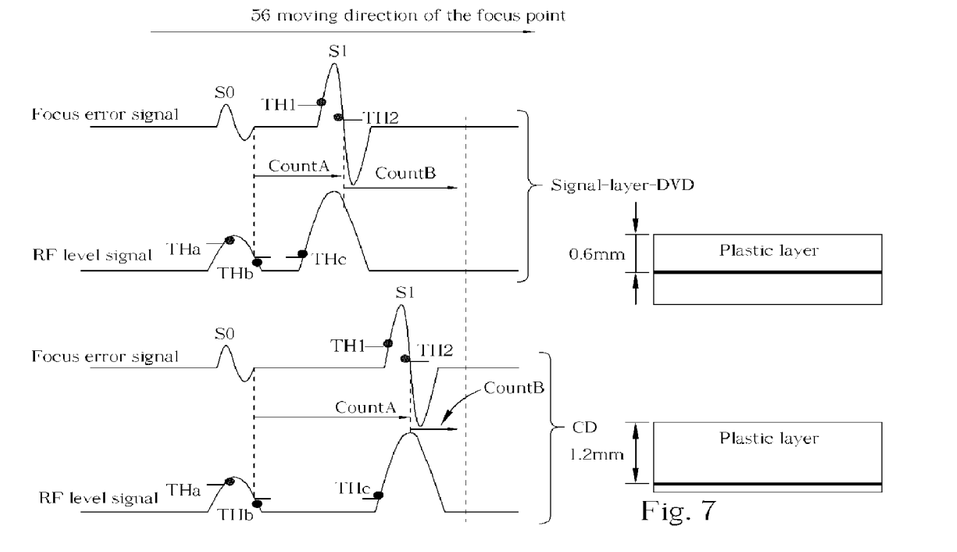
FIG. 7 is a comparative diagram illustrating the signals of a CD and a single-layer DVD.

Please refer to FIG. 7. FIG. 7 is a comparative diagram illustrating the signals of a CD and a single-layer DVD. The countA of the CD is much greater than the countA of the single-layer DVD because the thickness of the plastic layer of the CD is greater than the thickness of the plastic layer of the single-layer DVD. Hence the format of the optical disk can be discriminated to be the CD or the single-layer DVD according to the countA.

Figure 8:
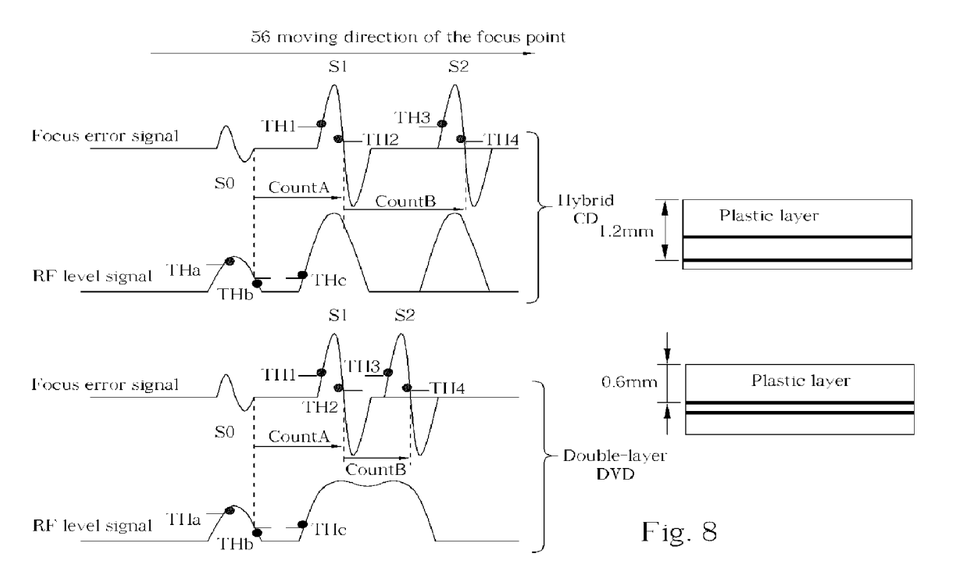
FIG. 8 is a comparative diagram illustrating the signals of a Hybrid CD and a double-layer DVD.

FIG. 8 is a comparative diagram illustrating the signals of a Hybrid CD and a double-layer DVD. If the focus error signal meets the threshold level of the focus error signal TH3, the optical disk is a double-layer disk. The countB of the Hybrid CD is much greater than the countB of the double-layer DVD because the distance between the second reflective layer and the first reflective layer of the Hybrid CD is greater than the distance between the second reflective layer and the first reflective layer of the double-layer DVD. Hence the format of the optical disk can be discriminated to be the Hybrid CD or the double-layer DVD according to the countB.

The present invention is not limited to the single-layer and the double-layer optical disks. The multiple-layer optical disks also can be discriminated according to the present invention in a similar way. In addition, a sub-beam add signal can be substituted for the RF level signal of the above-mentioned embodiment to make the same effect.

In contrast to the prior art, the advantage of the present invention is detecting the optical disk more stably and precisely. It is because a first focus search is utilized for determining the thresholds of the material layers, and a second focus search is utilized for detecting the distances between the material layers of the optical disk so as to discriminate the format of the optical disk completely and accurately instead of utilizing constant thresholds of the signals in the prior art.

The other advantage of the present invention is to improve the problem that the S-curve of the plastic layer is unobvious when detecting the S-curve in the prior art. That is, the RF level signal substitutes for the S-curve to detect the plastic layer, and then the format of the optical disk can be discriminated from the S-curve according to the thickness of the plastic layer and the distances between the material layers in the present invention.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for discriminating an optical disk comprising:
    operating a focus search for the optical disk to calculate a plurality of peak values and a plurality of trough values of a plurality of signals;
    determining a plurality of threshold levels for detecting a plurality of material layers of the optical disk according to the peak values and the trough values of the said signals;
    repeating the focus search for the optical disk to calculate a plurality of distances between the material layers of the optical disk according to the plurality of threshold levels; and
    discriminating the optical disk according to the calculated distances.

2. The method of claim 1 wherein each threshold level is the product of each peak value or each trough value and a predetermined ratio.

3. The method of claim 1 wherein the focus search operation is a focus open-loop control method.

4. The method of claim 1 wherein the signals are a sub-beam add signal and a focus error signal.

5. The method of claim 1 wherein the signals are an RF signal and a focus error signal.

6. The method of claim 5 wherein the step of repeating the focus search for the optical disk further comprising the step of detecting the RF signal first until a focus point approaches a first reflective layer by detecting the RF signal, and then detecting the focus error signal.

7. The method of claim 1 wherein the plurality of material layers includes a plastic layer and a first reflective layer.

8. The method of claim 7 wherein the plurality of material layers further includes a second reflective layer.

9. A method for discriminating an optical disk comprising:
    operating a focus search for the optical disk to detect a plurality of peak values and a plurality of trough values of a first signal and a second signal wherein the peak values and the trough values are generated when detecting a plurality of material layers of the optical disk;
    generating a plurality of threshold levels for detecting the material layers of the optical disk by multiplying each peak/trough value and a corresponding ratio;
    repeating the focus search for the optical to calculate a plurality of distances between the material layers of the optical disk according to the threshold levels; and
    discriminating the optical disk according to the calculated distances.

10. The method of claim 9 wherein the focus search operation is a focus open-loop control method.

11. The method of claim 9 wherein the first signal is a sub-beam add signal and the second signal is a focus error signal.

12. The method of claim 9 wherein the first signal is an RF signal and the second signal is a focus error signal.

13. The method of claim 12 wherein the step of repeating the focus search for the optical disk further comprising the step of detecting the RF signal first until a focus point approaches a first reflective layer of the optical disk by detecting the RF signal, and then detecting the focus error signal.

14. The method of claim 9 wherein the plurality of material layers includes a plastic layer and a first reflective layer.

15. The method of claim 14 wherein the plurality of material layers further includes a second reflective layer.

16. A method for discriminating an optical disk comprising:
   operating a focus search for the optical disk to detect a plastic layer of the optical disk with a first signal;
   detecting a first reflective layer of the optical disk with a second signal when the first signal detects the first reflective layer;
   calculating a distance between a detected plastic layer and a detected reflective layer; and
   discriminating the optical disk according to the calculated distance.

17. The method of claim 16 further comprising detecting a second reflective layer with the second signal if the second reflective layer of the optical disk exists.

18. The method of claim 16 wherein the first signal is a sub-beam add signal and the second signal is a focus error signal.

19. The method of claim 16 wherein the first signal is an RF signal and the second signal is a focus error signal.

20. The method of claim 16 wherein the first reflective layer exists when the first signal detects a first threshold value.

21. The method of claim 20 wherein a focus point passes through the first reflective layer when the first signal detects a second threshold value and then detects a third threshold value.

22. The method of claim 21 wherein the second threshold value is not equal to the third threshold value.

23. The method of claim 17 wherein a focus point passes through the second reflective layer when the second signal detects a fourth threshold value and then detects a fifth threshold value.

24. The method of claim 23 wherein the fourth threshold value is not equal to the fifth threshold value.

25. The method of claim 16 wherein the focus search operation is a focus open-loop control method.

* * * * *

UNITED STATES PATENT AND TRADEMARK OFFICE
CERTIFICATE OF CORRECTION

PATENT NO. : 7,233,556 B2
APPLICATION NO. : 10/711212
DATED : June 19, 2007
INVENTOR(S) : Yu-Hung Sun

It is certified that error appears in the above-identified patent and that said Letters Patent is hereby corrected as shown below:

On the Title Page, Item (73), Assignee, the residence should be corrected form "Nelhu" to --Neihu --

Signed and Sealed this

Second Day of October, 2007

JON W. DUDAS
*Director of the United States Patent and Trademark Office*